United States Patent
Vulkan

(10) Patent No.: US 9,112,943 B1
(45) Date of Patent: Aug. 18, 2015

(54) SYSTEM AND METHOD FOR RETRIEVING, STORING AND DISTRIBUTING DIGITAL BROADCAST MEDIA IN A CLOUD-COMPUTING ENVIRONMENT

(71) Applicant: SAMSUNG INFORMATION SYSTEMS AMERICA, INC., San Jose, CA (US)

(72) Inventor: Roee Vulkan, Tenafly, NJ (US)

(73) Assignee: Samsung Research America, Inc., San Jose, CA (US)

( * ) Notice: Subject to any disclaimer, the term of this patent is extended or adjusted under 35 U.S.C. 154(b) by 44 days.

(21) Appl. No.: 13/790,853

(22) Filed: Mar. 8, 2013

Related U.S. Application Data

(60) Provisional application No. 61/621,288, filed on Apr. 6, 2012.

(51) Int. Cl.
 *H04N 7/173* (2011.01)
 *H04L 29/06* (2006.01)
 *H04N 21/258* (2011.01)

(52) U.S. Cl.
 CPC ........ *H04L 65/601* (2013.01); *H04N 21/25866* (2013.01)

(58) Field of Classification Search
 CPC .......... H04N 21/4622; H04N 7/17318; H04N 5/44543; G06F 15/16
 USPC ................. 725/109, 114–116, 93, 78, 80, 82, 725/131–134, 139–142, 151–153; 709/231
 See application file for complete search history.

(56) References Cited

U.S. PATENT DOCUMENTS

| | | | |
|---|---|---|---|
| 6,496,856 B1 * | 12/2002 | Kenner et al. | 709/218 |
| 6,889,383 B1 * | 5/2005 | Jarman | 725/28 |
| 7,222,168 B2 * | 5/2007 | Kitamura et al. | 709/223 |
| 7,245,819 B1 * | 7/2007 | Sanders | 386/241 |
| 7,340,764 B2 * | 3/2008 | Kubota et al. | 725/90 |
| 7,747,819 B2 * | 6/2010 | Fujii | 711/114 |
| 7,769,903 B2 * | 8/2010 | Robbin et al. | 709/248 |
| 8,078,738 B2 * | 12/2011 | Dinkel et al. | 709/228 |
| 8,279,342 B2 * | 10/2012 | Hasegawa et al. | 348/466 |
| 8,451,850 B2 * | 5/2013 | Lewis | 370/401 |
| 8,584,183 B2 * | 11/2013 | Arsenault et al. | 725/89 |
| 2002/0154892 A1 * | 10/2002 | Hoshen et al. | 386/87 |

* cited by examiner

*Primary Examiner* — Annan Shang
(74) *Attorney, Agent, or Firm* — Sherman IP LLP; Kenneth L. Sherman; Hemavathy Perumal

(57) ABSTRACT

Systems and methods for retrieving, storing and distributing multimedia content in a cloud computing environment. The multimedia content may be divided into a plurality of segments using a multimedia content receiving device. The method of retrieving, storing and distributing multimedia content may include receiving a first segment of a plurality segments of the multimedia content from a first multimedia content receiving device coupled to a communication network and receiving a second segment of the plurality of segments of the multimedia content from a second multimedia content receiving device coupled to a communication network. The method may further include storing the first and the second segments on a network storage device. The systems and methods permit users to upload multimedia content, store it in the cloud, and watch it back on a variety of different multimedia devices.

44 Claims, 8 Drawing Sheets

SYSTEM AND METHOD FOR RETRIEVING, STORING AND DISTRIBUTING DIGITAL BROADCAST MEDIA IN A CLOUD-COMPUTING ENVIRONMENT

CROSS REFERENCE TO RELATED APPLICATIONS

This application claims priority under 35 U.S.C. §119(e) to U.S. Provisional Patent Application No. 61/621,288, filed on Apr. 6, 2012, which is incorporated herein by reference in its entirety.

BACKGROUND

1. Field of Invention

Embodiments of the present invention relate generally to multimedia, and more particularly, to systems and methods for retrieving, storing and distributing multimedia content in a cloud storage environment.

2. Discussion of Related Art

A digital video recorder (DVR) is a conventional device for recording television programs received over the air or via a cable or satellite provider. In contrast to a video cassette recorder (VCR) which uses magnetic tape, a DVR typically has a hard disk drive (HDD) or solid state memory in which video is stored digitally for subsequent viewing.

Conventional DVRs have several limitations. For example, the number and length of recorded programs is limited by the capacity of the HDD or memory. Thus, if the HDD or memory becomes full, the DVR must either suspend recording new programs or delete previously recorded programs to make room for the new programs. Neither of these options is desirable, since the user may lose access to the previously recorded programs or forgo the ability to record new programs until older programs are deleted. Although the recording capacity of some conventional DVRs may be increased by adding storage hardware (e.g., a second or larger HDD), there is a substantial cost associated with purchasing and installing the additional hardware. Furthermore, most storage hardware, including HDDs and solid-state memory, is subject to failure, which may cause the DVR to permanently lose some or all of the recorded programs. Redundant or fault-tolerant memory is not typically employed in DVRs due to cost and other practical considerations.

SUMMARY

Systems and methods according to various embodiments of the present invention permit users to upload broadcast multimedia content, store that multimedia content in a network-based cloud storage environment, and watch that multimedia content on a variety of different types of multimedia devices within or outside the home. The user watching the multimedia content need not be the same user that uploaded the multimedia content.

According to one aspect, a method of retrieving, storing and distributing multimedia content includes receiving, by a network storage device coupled to a communication network, a first segment of a plurality segments of the multimedia content from a first multimedia content receiving device coupled to the communication network; receiving, by the network storage device, a second segment of the plurality of segments of the multimedia content from a second multimedia content receiving device coupled to the communication network, the second segment being different than the first segment; and storing the first segment and the second segment on the network storage device. The plurality of segments may be non-overlapping segments.

In some embodiments, the method may further comprise determining, by the network storage device, whether the first segment is stored on the network storage device. In response to determining that the first segment is not stored on the network storage device, the method may further comprise sending a first request to the first multimedia content receiving device requesting the first multimedia content receiving device to upload the first segment to the network storage device via the communication network. The method may further comprise determining, by the network storage device, whether the second segment is stored on the network storage device. In response to determining that the second segment is not stored on the network storage device, the method may further comprise sending a second request to the second multimedia content receiving device requesting the second multimedia content receiving device to upload the second segment to the network storage device via the communication network.

In some embodiments, the method may further comprise assigning a unique identifier to each of the plurality of segments of the multimedia content. Determining whether the first segment is stored on the network storage device may include determining whether the unique identifier assigned to any of the plurality of segments of the multimedia content stored on the network storage device is the same unique identifier assigned to the first segment. Determining whether the second segment is stored on the network storage device may include determining whether the unique identifier assigned to any of the plurality of segments of the multimedia content stored on the network storage device is the same unique identifier assigned to the second segment. In some embodiments, the method may further comprise sending, to the first multimedia content receiving device, a first command directing the first multimedia content receiving device to tune into a channel broadcasting the multimedia content. The method may further comprise sending, to the second multimedia content receiving device, a second command directing the second multimedia content receiving device to tune into the channel broadcasting the multimedia content.

In various embodiments, the method may comprise receiving, by the network storage device, a request from a user device operatively coupled to the communication network to access at least one of the plurality of segments of the multimedia content stored on the network storage device. The method may further comprise sending at least one of the plurality of segments of the multimedia content from the network storage device to the user device through the communication network in response to receiving the request from the user device. The method may further comprise formatting the plurality of segments of the multimedia content in one of a plurality of formats compatible with the user device prior to sending at least one of the plurality of segments of the multimedia content from the network storage device to the user device.

In some embodiments, the method may further comprise determining, in response to receiving the request from the user device, whether the user device is associated by subscription with at least one of the first multimedia content receiving device and the second multimedia content receiving device, and sending at least one of the plurality of segments of the multimedia content from the network storage device to the user device only if the user device is determined to be associated by subscription with the at least one of the first multimedia content receiving device and the second multimedia content receiving device.

In accordance with various embodiments, the method may further comprise creating and maintaining, on the network storage device, a first listing of each of the plurality of segments of the multimedia content received by the first multimedia content receiving device and a second listing of each of the plurality of segments of the multimedia content received by the second multimedia content receiving device. In some embodiments, the first listing uniquely identifies each segment of the plurality of segments received by the first multimedia content receiving device, and at least one of a unique identifier of the first multimedia content receiving device, a signal frequency or a channel identifier of a channel over which each segment of the plurality of segments of the multimedia content was received by the first multimedia content receiving device, and a timestamp indicative of a time at which each segment of the plurality of segments of the multimedia content was received by the first multimedia content receiving device.

According to another aspect, a method of retrieving, storing and distributing multimedia content may comprise receiving at least a portion of the multimedia content from a content provider using a multimedia content receiving device; dividing the received portion of the multimedia content into a plurality of segments of the multimedia content using the multimedia content receiving device; and uploading at least one of the plurality of segments from the multimedia content receiving device to a network storage device via a communication network. The plurality of segments may be non-overlapping segments. In some embodiments, the method may comprise receiving, from the network storage device via the communication network, a request to upload the at least one of the plurality of segments of the multimedia content to the network storage device, and in response thereto, uploading the at least one of the plurality of segments of the multimedia content to the network storage device. The method may further comprise receiving, from the network storage device via the communication network, a command directing the multimedia content receiving device to tune into a channel broadcasting the multimedia content, and in response thereto, tuning the multimedia content receiving device into the channel broadcasting the multimedia content.

In some embodiments, the method of retrieving, storing and distributing multimedia content may comprise sending a communication to the network storage device via the communication network identifying each segment of the plurality of segments of the received portion of the multimedia content. In accordance with these embodiments, the communication uniquely identifies each segment of the plurality of segments of the received portion of the multimedia content and further includes at least one of a unique identifier of the multimedia content receiving device, a signal frequency of a channel over which the received portion of the multimedia content was received, a channel identifier of the channel over which the received portion of the multimedia content was received, and a timestamp indicative of a time at which each segment of the plurality of segments of the received portion of the multimedia content was received. In accordance with some embodiments, the method may further comprise sending a communication to the network storage device via the communication network identifying each segment of the plurality of segments of the received portion of the multimedia content that is available for uploading. In some embodiments, the method may further comprise notifying the network storage device via the communication network that the at least one of the plurality of segments is being uploaded.

According to another aspect, a system for retrieving, storing and distributing multimedia content is provided. The system may comprise a network storage device operatively coupled to a communication network. The network storage device may include a storage medium and a processor configured to receive a first segment of a plurality of segments of the multimedia content from a first multimedia content receiving device operatively coupled to the communication network; to receive a second segment of the plurality of segments of the multimedia content from a second multimedia content receiving device operatively coupled to the communication network, the second segment being different than the first segment; and to store the first segment and the second segment on the storage medium. The plurality of segments may be non-overlapping segments.

In some embodiments, the processor may further be configured to determine whether the first segment is stored on the storage medium. The processor may further be configured to send a first request to the first multimedia content receiving device requesting the first multimedia content receiving device to upload the first segment to the network storage device via the communication network in response to determining that the first segment is not stored on the storage medium. The processor may further be configured to determine whether the second segment is stored on the storage medium. The processor may further be configured to send a second request to the second multimedia content receiving device requesting the second multimedia content receiving device to upload the second segment to the network storage device via the communication network in response to determining that the second segment is not stored on the storage medium.

The processor may further be configured to receive a unique identifier for each of the plurality of segments of the multimedia content. The processor may further be configured to determine whether a unique identifier assigned to any of the plurality of segments of the multimedia content stored on the storage medium is the same as the unique identifier assigned to the first segment. The processor may further be configured to determine whether a unique identifier assigned to any of the plurality of segments of the multimedia content stored on the storage medium is the same as the unique identifier assigned to the second segment.

In some embodiments, the processor may be configured to send, to the first multimedia content receiving device, a first command directing the first multimedia content receiving device to tune to a channel broadcasting the multimedia content. The processor may further be configured to send, to the second multimedia content receiving device, a second command directing the second multimedia content receiving device to tune to the channel broadcasting the multimedia content.

In some embodiments, the processor may be configured to receive a request from a user device operatively coupled to the communication network to send at least one of the plurality of segments of the multimedia content stored on the storage medium to the user device via the communication network. The processor may further be configured to send at least one of the plurality of segments of the multimedia content from the network storage device to the user device through the communication network in response to receiving the request from the user device. The processor may further be configured to format the plurality of segments of the multimedia content in one of a plurality of formats compatible with the user device prior to sending at least one of the plurality of segments of the multimedia content from the network storage device to the user device. In some embodiments, the processor may be configured to determine, in response to receiving the request from the user device, whether the user device is associated by subscription with at least one of the first multimedia content receiving device and the second multimedia content receiving device, and to send at least one of the plurality of segments of the multimedia content from the network storage device to the user device only if the user device is determined to be associated by subscription with the at least one of the first multimedia content receiving device and the second multimedia content receiving device.

According to another aspect, there is provided a non-transitory computer readable medium having stored thereon sequences of instructions including instructions that will cause a processor of a network storage device having a storage medium therein and being operatively coupled to a communication network to receive a first segment of a plurality of segments of the multimedia content from a first multimedia content receiving device operatively coupled to the communication network; to receive a second segment of the plurality of segments of the multimedia content from a second multimedia content receiving device operatively coupled to the communication network, the second segment being different than the first segment; and to store the first segment and the second segment on the storage medium. The plurality of segments may be non-overlapping segments.

In some embodiments, the non-transitory computer readable medium may further include an instruction to cause the processor to determine whether the first segment is stored on the storage medium. The non-transitory computer readable medium may further include an instruction to cause the processor to send a first request to the first multimedia content receiving device requesting the first multimedia content receiving device to upload the first segment to the network storage device via the communication network in response to determining that the first segment is not stored on the storage medium.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
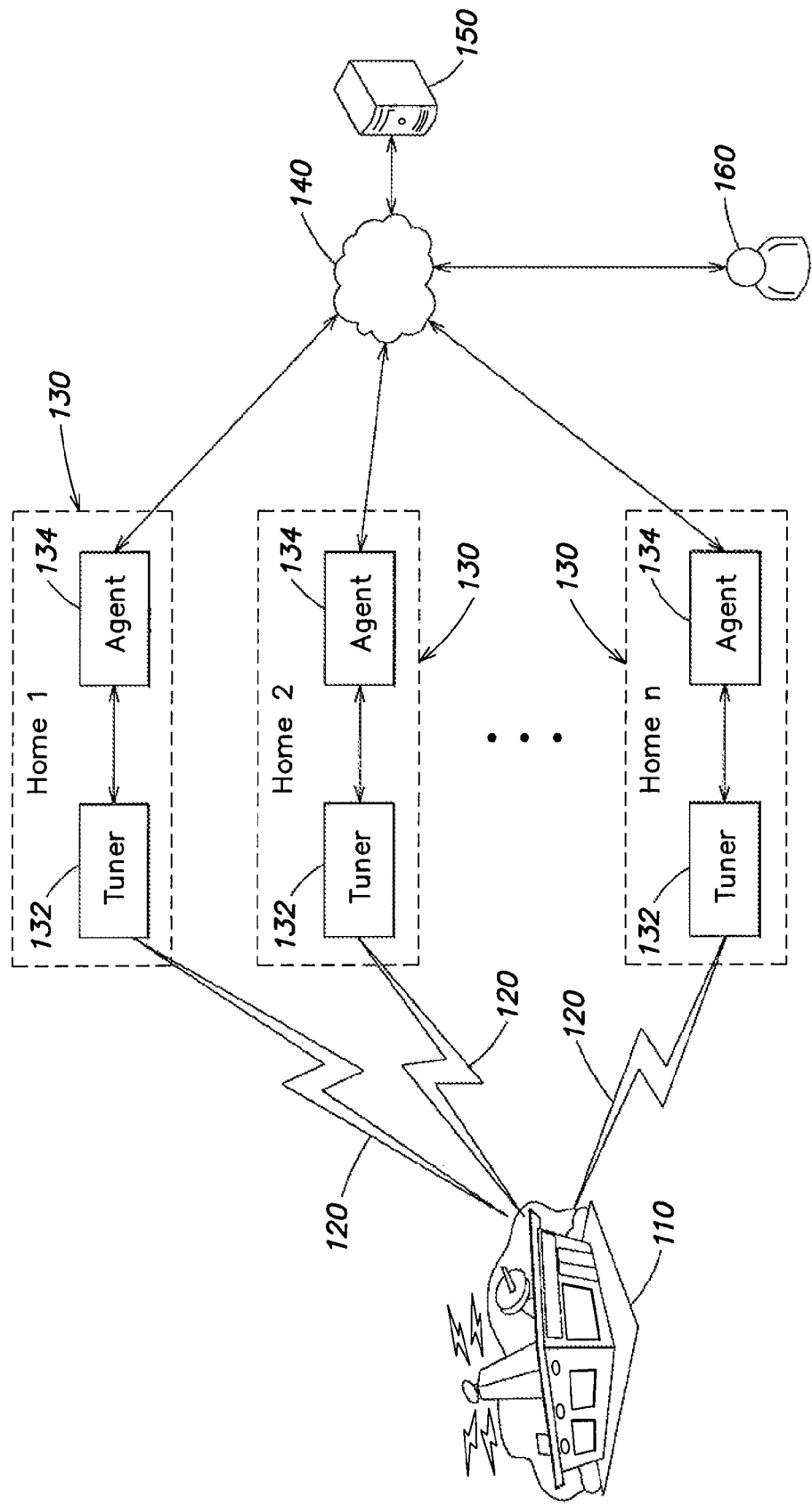
FIG. 1 is a block diagram of one example of a system in accordance with one embodiment.

Embodiments of this invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

DVRs and other conventional solutions for home recording of broadcast multimedia have a number of limitations, including fixed storage capacity, and are not typically designed to permit remote viewing outside of the household. Programs recorded by the DVR are stored within the DVR and are viewable on one or more televisions connected to the DVR. This limitation has several drawbacks. First, the DVR cannot record programs while there is a local service interruption, such as may occur if the over-the-air antenna or the cable or satellite receiver fails. Second, programs recorded on a conventional DVR are not typically viewable outside of the home. Some existing technologies permit a user to view programs stored on the DVR remotely using an Internet connection; however, there are typically bandwidth limitations associated with uploading multimedia through a common home Internet connection that make this technique impractical. Furthermore, such technologies are designed for direct access to the DVR, which requires a reliable Internet connection to the DVR.

According to one aspect of the present invention, it is appreciated that virtually unlimited and highly reliable multimedia storage can be obtained using an Internet-based cloud storage approach. Cloud storage may typically refer to one or more network storage devices provided as shared resources that are accessible using the Internet. However, this is not limiting and cloud storage as used herein may generally refer to any infrastructure, platform or software in any cloud computing environment known to one of ordinary skill in the art. Because cloud storage can be highly scalable and fault-tolerant, it is well adapted for managing large amounts of data associated with multimedia content. It is further appreciated that a conventional DVR is typically idle most of the time. In other words, although the DVR may be constantly receiving television programs, a relatively small number of those programs are recorded by the DVR. In this respect, conventional DVRs are underutilized. According to another aspect, a multimedia content receiving device may be employed to acquire content that is not being recorded for a household member during the time that the multimedia content receiving device would otherwise be idle.

FIG. 1 is a block diagram showing one example of a system for retrieving, storing and distributing digital broadcast media, according to one embodiment. A content provider 110, such as a television station, cable or satellite television provider, broadcasts a signal 120 over the air or via cable or satellite to a plurality of homes 130. The signal 120 broadcast by the content provider 110 generally includes a television program, although the signal 120 may include other forms of media content, such as music, radio programs, audio messages, data, public information, weather information, and other types of audio and/or video. Each home 130 includes a multimedia content receiving device having at least one tuner 132 for receiving the signal 120 and an agent 134 operatively coupled to the tuner 132 and a communication network 140, such as the Internet. The agent 134 may be a hardware, firmware and/or software component of the tuner 132, or a separate component. One or more network storage devices 150 may be operatively coupled to the network 140. Additionally, one or more users 160 may access the network storage device 150 via the network 140, as further described below.

As discussed above, the signal 120 may include audio and video media content, and the signal 120 may be broadcast digitally. For example, signal 120 may be broadcast as a digital television (DTV) or a quadrature amplitude modulated (QAM) signal. Although not shown in FIG. 1, it will be understood that there may be more than one content provider 110 (e.g., different television stations or cable or satellite providers). Each content provider 110 may broadcast a different signal 120 to the homes 130, thereby permitting each home 130 to receive content from more than one content provider 110. For example, in most urban areas there are many television stations each broadcasting over-the-air signals on different frequencies, which may be received by a compatible television tuner and antenna. Generally, each of the homes 130 is geographically located within a region served by the content provider 110, although the homes 130 may be located elsewhere provided that each home 130 has some form of reception of the signal 120. For example, some homes 130 not located within the coverage area of a content provider 110 (e.g., a broadcast television station) may receive the signal 120 via landline, cable, or microwave or satellite dish rather than over the air.

As mentioned above, within each home 130 is at least one tuner 132. Each tuner 132 is configured to receive the signal 120 and optionally decode and/or convert the signal 120 for viewing the multimedia content on a conventional television, or for storing the content for future viewing. The agent 134 may be operatively coupled to one or more of the tuners 132. As will be described below, each agent 134 is configured to acquire one or more portions (also referred to herein as segments) of the content received by the corresponding tuner(s) 132. In one embodiment, each agent 134 is configured to send one or more of the acquired segments of content over the network 140 to one or more storage devices 150 for storage in the cloud. In some embodiments, each agent 134 is configured to request and receive the segments from the storage devices 150, for example, for retrieving and displaying the content stored in the network storage device 150 at a later time.

The network 140 may include, for example, the Internet or an intranet, and communications between each agent 134 and the storage device 150 may be established using any conventional communication protocol, such as TCP/IP, as will be understood by one of skill in the art. In one example, communication channels between agents 134 and the storage device 150 may have relatively low bandwidth. However, multimedia content may be segmented and transferred in parallel using multiple agents 134, thereby allowing fast transfer of large amounts of content over network 140. The network 140 may be configured to transmit data at, for example, 20 megabits per second, or at any other supported speed. The user(s) 160 may access some or all of the content stored in the storage device 150 using, for example, a portable media player, smart phone, or other device capable of accessing the network 140 and retrieving and displaying the content stored in the network storage devices 150, including the multimedia content receiving device (e.g., the tuner 132 and/or the agent 134).

In one embodiment, although each tuner 132 may be capable of receiving the signal 120, each tuner 132 may be programmed to either acquire or ignore the received signal 120. For example, if the signal 120 is a free, publicly available signal, then the tuner 132 may be programmed to acquire the signal 120 as it is received, and subsequently display it on a television and/or prepare the signal for storage. However, in some instances the signal 120 may be acquired by subscription only, for example, if the content provider 110 provides programs to individual viewers on a paid-subscription basis. In such cases, the tuner 132 may be programmed to acquire the received signal 120 only if the viewer has an active subscription to the signal 120, and to ignore or discard the received signal 120 if no subscription is active. Thus, the ability of each tuner 132 to acquire the signal 120 may vary from home-to-home and tuner-to-tuner. In another embodiment, any or all of the tuners 132 may be configured to both receive and acquire the signal 120; however, some tuners 132 may not permit viewing of the acquired content except by subscription. For example, if a particular viewer does not have a subscription to a particular program, the viewer may not be permitted to view the program either as it is received by the tuner 132 or subsequently by retrieval from the storage device 150, even if the tuner 132 acquires the signal 120 and provides it to the network storage device 150. Signal 120 may be encrypted and a tuner 132 may be configured to acquire an encrypted signal 120. In one embodiment, the tuner 132, agent 134 and/or another device may be configured to decrypt the received encrypted signal 120 and to provide a decrypted signal to the network storage device 150. In another embodiment, the tuner 132 and/or agent 134 may be configured to receive an encrypted signal 120 and to provide the encrypted signal to the network storage device 150.

Each tuner 132 may, for example, be configured to tune into a television channel associated with the signal 120, and to tune into different channels upon receipt of a command. The command to tune into a particular channel may be provided by, for example, an input device such as a conventional handheld remote controller or from a remote system (e.g., the network storage device 150) via the network 140.

Figure 2:
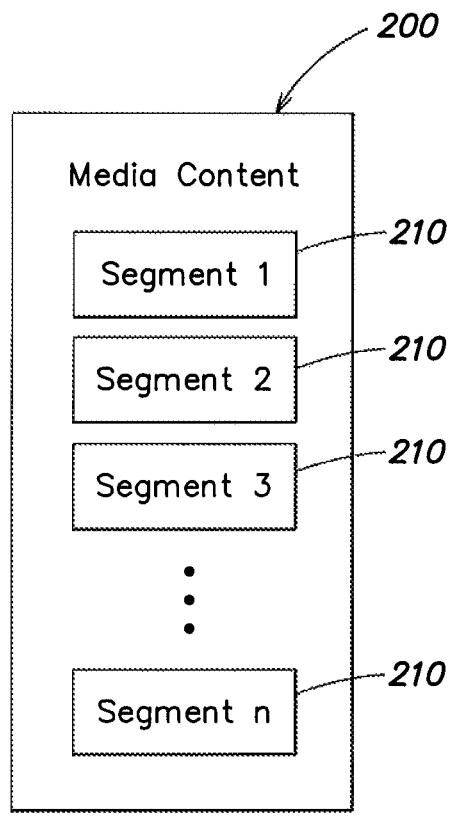
FIG. 2 is one example of media content segmented in accordance with one embodiment.

As discussed above with respect to FIG. 1, each content provider 110 provides a signal 120 including at least one type of media content. FIG. 2 is a block diagram representing one example of a media content 200 broadcast by the content provider 110 and segmented according to one embodiment. The media content 200 includes, for example, a television program, video or other multimedia content which may be divided into n segments 210, referred to herein as Segment 1 through Segment n. Each segment 210 represents a different portion of the media content 200, such that all segments 210, when placed in order, form the entirety of the media content 200. For example, a 30-minute program may be divided into 1,800 one-second long segments 210, which when arranged in order by time (e.g., earliest to latest) form the entire 30-minute program. In one embodiment, media content 200 may be segmented with no overlap between segments 210. However, it is to be appreciated that segments 210 may generally be overlapping segments. In one example, the media content 200 may be divided at each key frame of program video to form segments 210. For instance, where the media content 200 is a video encoded using an I-, P- and B-frame based video compression algorithm, each key frame may correspond to an Intra frame (I frame). In other examples, media content 200 may be segmented at another predetermined interval. It will be understood that the number and character of the segments described above is exemplary, and that other configurations of the segments 210 may be utilized.

In one embodiment, each of the tuners 132 and/or agents 134 of FIG. 1 may be configured to divide the media content 200 into one or more segments 210, and may be further configured to generate a hash value or other unique identifying marker associated with each segment 210. In one embodiment, the unique identifying marker associated with each segment 210 may include a hash value of segment 210 and may further include an identifier of media content 200. Each of the tuners 132 and/or agents 134 of FIG. 1 may be configured to generate the same hash value or unique identifying marker for a respective segment 210 of media content 200. In another embodiment, a marker associated with each segment 210 may include a unique identifying portion and may further include any other information or metadata relevant to the retrieval, storage and distribution of media content 200, such as an identifier associated with the tuner used to receive the segment 210 of the media content, a time stamp indicative of a universal time (e.g. Greenwich Mean Time or relative to any other time reference) when the segment was received from the tuner, the physical location of the tuner, bandwidth, signal quality and error data, etc. Metadata may include the total number of segments of the media content where, for example, all of the media content has been stored by the tuner 132 and/or agent 134. The metadata may include the number of video/audio frames inside a segment, where, for example, the tuner 132 and/or agent is processing a live stream of media content. In some embodiments, a unique identifying marker associated with a segment 210 may only include a hash value of the segment and additional values such as tuner identifiers may be retrieved and stored by the network storage device 150 as metadata associated with the hash value of the corresponding segment. Furthermore, some metadata, such as an IP address and time stamp of the transmission of a segment, may be added by the network storage device 150.

In some embodiments, each agent 134 may be configured to demultiplex a signal 120. In one example, a signal 120 carrying both audio and video media content may be demultiplexed by each agent 134 to generate separate audio and video signals. Each agent 134 may further be configured to segment the video signal and may optionally segment the audio signal. Each agent 134 may further be configured to compute a hash value for each segment of the video signal and may optionally hash the audio signal. In one example, each agent 134 may be configured to apply a cryptographic hash function such as the SHA-1 that produces a 20 byte hash value or the MD5 function that produces a 16 byte hash value. Each agent 134 may further be configured to store or buffer computed hash values and to send the computed hash values to the network storage device 150. Hash values may be sent to the network storage device 150 on a segment by segment basis. An agent 134 may not need to send any segment to the network storage device 150, for example, if the segments corresponding to the sent hash values are already stored in the network storage device 150. In this manner, data transmitted by each agent 134 may be significantly reduced relative to the received signal 120. In some embodiments, agent 134 may be configured to delete locally stored segments in response to receiving a message from the network storage device 150 confirming that the segments are stored in the network storage device.

Figure 3:
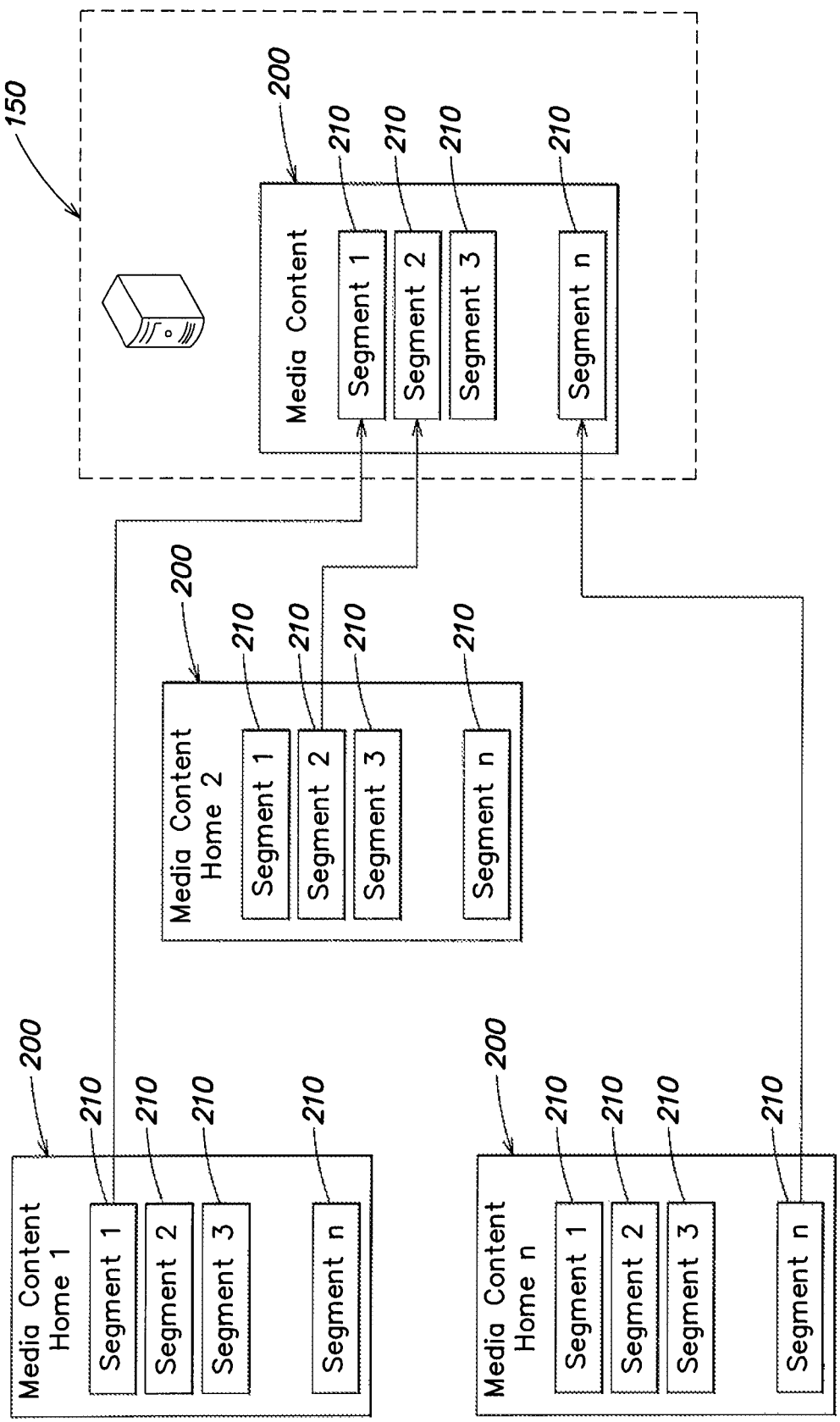
FIG. 3 is a block diagram illustrating one example of a technique for retrieving and storing the media content of FIG. 2 in accordance with one embodiment.

FIG. 3 is a block diagram illustrating one example of a technique for retrieving and storing the segments 210 of the media content 200 of FIG. 2, according to one embodiment. As discussed above, the media content 200 may be divided into multiple segments 210, where all of the segments 210 in combination form the entirety of the media content 200. In this example, the media content 200 is received by a tuner 132 at each home 130, as described above with respect to FIG. 1, and divided into multiple segments 210 by each tuner 132 and/or agent 134. All of the tuners 132/agents 134 are configured to divide the same media content 200 in exactly the same manner, so that any segment 210 produced by one tuner 132/agent 134 is identical to the corresponding segment 210 produced by any other tuner 132/agent 134, in terms of the media content of the segment and the hash value or the unique identifying marker associated with the segment. Thus, there may be n identical copies of each segment 210, one copy on each of n tuners 132/agents 134 in n homes as shown in FIG. 3. The media content 200 may be divided into the segments 210 at the same time that the media content 200 is received by the tuner 132, or stored in memory (not shown) and subsequently divided. There may be any number of tuners 132 and any number of agents 134 utilized for receiving, acquiring and dividing any single media content 200 into the segments 210 in any number of homes 130. In some embodiments, each of m homes may include any number of tuners 132 and/or agents 134 configured to acquire and divide a media content 200 into n segments 210. The number of segments n may vary depending on the media content 200 and configuration of the tuners 132 and/or agents 134.

After any segment 210 of the media content 200 has been generated by any of the tuners 132/agents 134, the respective tuner 132 or corresponding agent 134 can calculate a unique identification marker associated with the segment 210 of the media content 200. For example, the agent 134 may calculate an audio fingerprint that uniquely identifies the segment 210 according to the audio content of the segment 210. In one embodiment, the agent 134 sends the unique identification marker to the network storage device 150 to indicate to the network storage device 150 that the agent 134 (or the associated tuner 132) has the corresponding segment 210 in its possession. In other words, by sending the unique identification marker to the network storage device 150, the agent 134 is notifying the network storage device 150 that the segment 210 corresponding to the unique identification marker is available for upload to the network storage device 150. The network storage device 150 may compare the unique identification marker to a list of unique identification markers maintained by the network storage device 150 to determine whether the segment 210 corresponding to the unique identification marker has already been uploaded and stored in the network storage device 150. If, for example, the network storage device 150 determines that the segment 210 corresponding to the unique identification marker has not yet been stored by the network storage device 150, the network storage device 150 may send a request to upload the segment 210 from any one or more of the agents 134 that sent the unique identification marker to the network storage device 150.

In certain embodiments, the network storage device may request multiple copies of each segment, for reliability, robustness, or redundancy reasons. In such embodiments, the network storage device 150 may be configured to determine whether a determined number of copies of the segment 210 corresponding to the unique identification marker have already been uploaded and stored in the network storage device. If, for example, the network storage device 150 determines that the predetermined number (e.g., 5) of copies of the segment 210 that corresponds to the unique identification marker have not yet been stored by the network storage device 150, the network storage device 150 may send a request to upload the segment 210 from any one or more of the agents 134 that sent the unique identification marker to the network storage device 150. It should be appreciated that by requesting and storing multiple copies of each segment, the network storage device may select from among the multiple copies of the same segment those which have the highest signal quality and/or the lowest error rate, or based upon other criteria.

In one embodiment, the network storage device 150 may request one of the segments 210 of the media content 200 from one of the agents 134 and another one of the segments 210 from a different agent 134. In this manner, the media content 200 may be uploaded from different agents 134 to the network storage device 150 segment-by-segment, and no single agent 134 is necessarily used to upload all of the segments 210, thus distributing the retrieval of the media content 200 across many different agents 134 (and potentially many different homes 130). In some embodiments, different segments 210 of the same media content 200 may be uploaded from different agents 134 substantially in parallel. However, the network storage device 150 may request the same segment more than once and/or from more than one agent 134 if, for example, the segment 134 is incomplete or somehow corrupted when it is received by the network storage device 150. The network storage device 150 may also request more than one segment 210 of the media content 200 from the same agent 134.

Although the network storage device 150 may upload any segment 210 from any agent 134, in one embodiment, the network storage device 150 may upload each segment 210 only once. However, over the course of acquiring the entire program, the network storage device 150 may upload different segments 210 from more than one of the agents 134. For example, the network storage device 150 may request Segment 1 from the Home 1 agent, Segment 2 from the Home 2 agent, etc., until all segments of the media content 200 have been requested. In some instances, the network storage device 150 may send requests for one or more different segments 210 to a single agent 134. For example, one of the agents 134 may receive requests for Segments 1, 4, 19, and a different agent 134 may receive requests for Segments 2, 5, 20, etc. The number of requests sent to a particular agent may be dependent on the bandwidth of the communication channel by which the agent 134 communicates with the communication network 140, such that agents communicating over higher bandwidth communication channels may receive more requests than agents communicating over lower bandwidth communication channels. In another embodiment, the number of requests sent to a particular agent may be dependent on the strength or quality of the signal received from that agent. In response to receiving the respective requests for the segments 210, each agent 134 may upload the corresponding one or more segments 210 to the network storage device 150 through the network 140. In this manner, the process of retrieving all of the segments 210 of the media content 200 is distributed among multiple agents 134.

In one embodiment, the network storage device 150 may retrieve all of the segments 210 from fewer than all of the agents 134, i.e., some agents 134 may not be selected to upload any of the segments 210, since the network storage device 150 may retrieve all of the segments 210 from other agents 134. For example, if the media content 200 includes 2,000 segments and there are 3,000 agents 134 available to provide any of the segments 210, as many as 1,000 of the agents 134 may not be used to upload any segments 210 if all of the other 2,000 agents 134 upload at least one segment 210 each.

As each segment 210 is received by the network storage device 150, it is stored in one or more databases (not shown) on one or more storage devices. For example, the segment or segments 210 may be physically stored on multiple database servers or use other network-based storage resources, as may be found in a cloud storage environment.

In another embodiment, the network storage device 150 may send a request, via one of the agents 134, to a corresponding tuner 132 to tune to a different signal 120. For example, if the signal 120 for a particular television program is not currently tuned by an idle tuner 132 (e.g., a tuner not actively being used for viewing or storing another program), that tuner 132 may be requested to tune to another content provider 110 so that the network storage device 150 may store that program.

Referring back to FIGS. 1 and 2, once any segment 210 of the media content 200 has been uploaded to the network storage device 150, the user 160 may view the corresponding content 200 that is stored on the network storage device 150 by sending a request to the network storage device 150 (e.g., via the network 140). The user may view the content 200 on a compatible user device, for example, a conventional television, a portable media player, a smart phone, or other network-connected device that is configured to retrieve and display the content 200 from the network storage device 150. In one embodiment, the network storage device 150 is configured to send the content 200 to the user device in a format that is compatible with the user device. For example, if the user device is a 1080p high-definition (HD) television, the network storage device 150, which may include both a storage device and a server having a processing unit in a cloud computing environment, may send the content to the user device in a format that can be displayed on the 1080p HD television. In another example, if the user device is a personal computer (PC) running a Quicktime®-compatible video player by Apple Inc. of Cupertino, Calif., the network storage device 150 may send the content to the user device in an MPEG video format (e.g., MPEG-4).

Figure 4:
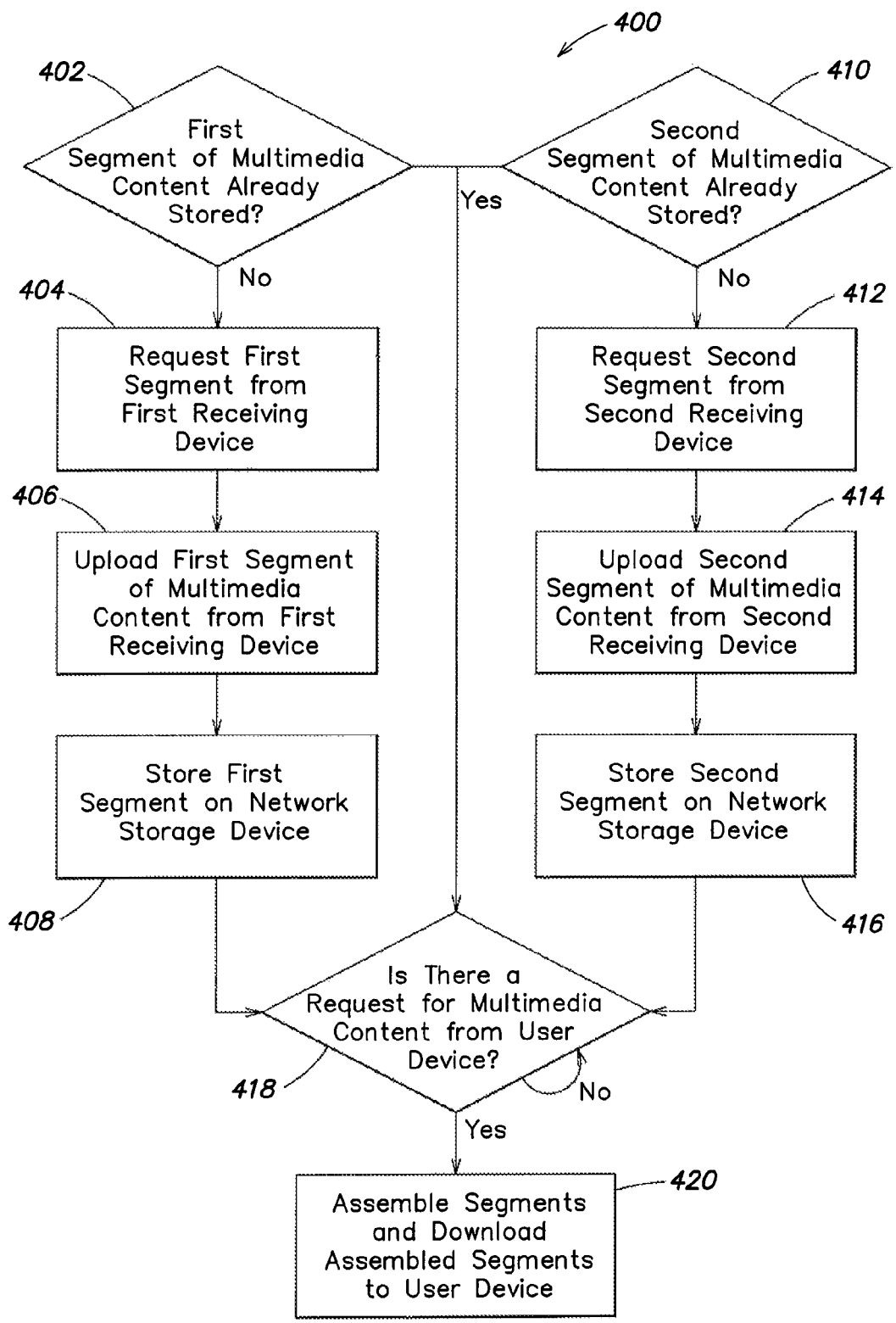
FIG. 4 is a flow diagram of one exemplary process of retrieving, storing and distributing the media content of FIG. 2 in accordance with one embodiment.

FIG. 4 is a flow diagram of one example of a method 400 for retrieving, storing and distributing multimedia content in accordance with one embodiment. The method 400 may be performed, for example, by the network storage device 150 of FIG. 1 or another computer having access to the data, including the multimedia content, stored by the network storage device 150 or other storage system. The data may be stored, for example, in one or more databases, and the databases may be implemented as part of a cloud storage environment. As described with respect to this example, multimedia content may refer, for example, to a single television program, multiple television programs, or other types, forms and combinations of multimedia content. Further, as discussed above with respect to FIGS. 2 and 3, the multimedia content may be divided into multiple segments. Each segment may be stored separately within one or more of the databases.

At block 402, the database is searched to determine whether a first segment of the multimedia content is already stored in the database. In one embodiment, searching the database to determine whether a segment is already stored may include using the hash value or the unique identifying marker of the segment to search the database. The first segment of the multimedia content may refer to any unique segment of the content (e.g., the segment 210 labeled Segment 1 of FIG. 2), but the first segment is not necessarily first in a sequence of all segments (e.g., the first segment may be Segment 2, Segment 3, and so on through Segment n). If the first segment is already stored in the database, then the method 400 proceeds to block 418, described below. Otherwise, the method proceeds to block 404. At block 404, a request to upload the first segment is sent to a first receiving device, which may include the tuner 132 and/or agent 134 in one of the homes 130 described above with respect to FIG. 1. The first receiving device responds to the request, at block 406, by uploading the requested first segment, which was previously stored locally by the first receiving device as it was acquired from the content provider. In this manner, the first segment is copied from the home 130 where it was acquired to the cloud storage environment. At block 408, once uploaded (or as it is being uploaded), the first segment is stored on the network storage device (e.g., in the database).

Blocks 410, 412, 414 and 416 are substantially similar to blocks 402, 404, 406 and 408 of the method 400, except that these blocks involve retrieving and storing a second segment of the multimedia content that is different than the first segment. As with the first segment, the second segment may refer to any unique segment of the content, is not necessarily the second segment in the sequence of all segments, and is not necessarily second in order with respect to the first segment; the second segment is merely a different segment than the first segment, and one of multiple segments of the multimedia content.

At block 410, the database is searched to determine whether the second segment of the multimedia content is already stored in the database. If the second segment is already stored in the database, then the method 400 proceeds to block 418, described below. Otherwise, the method proceeds to block 412. At block 412, a request to upload the second segment is sent to a second receiving device, which may include the tuner 132 and/or agent 134 in one of the homes 130 described above with respect to FIG. 1. The second receiving device responds to the request, at block 414, by uploading the requested second segment, which was previously stored locally by the second receiving device as it was acquired from the content provider. In this manner, the second segment is copied from the home 130 where it was acquired to the cloud storage environment. At blocks 412 and 414, the second receiving device may be the same as the first receiving device or a different receiving device (e.g., a tuner 132 and/or agent 134 in a different home 130 than the first receiving device or a different tuner 132/agent 134 in the same home 130 as the first receiving device). At block 416, once uploaded (or as it is being uploaded), the second segment is stored on the network storage device (e.g., in the database).

It should be appreciated that, for clarity, the method 400 shown in FIG. 4 only represents two segments of potentially many segments of the multimedia content, and that other segments may be processed in a manner similar to the first and second segments. For example, if the multimedia content includes 1,000 segments, then the process 400 may include acts similar to those described with respect to blocks 402 through 416 for retrieving and storing the remaining 998 segments of the multimedia content.

At block 418, the method 400 waits to receive a request for providing the multimedia content to a user device. In some embodiments, block 418 may trigger method 400 at blocks 402 and 410. That is, a request for multimedia content from a user device may trigger checking, at blocks 402 and 410, whether segments of the requested multimedia content are stored. If the segments are stored, the segments may be sent to the user device. If the segments are not stored, blocks 404, 406 and 408 and blocks 412, 414 and 416 may be performed to retrieve and store segments which are subsequently used to reconstruct and send the requested multimedia content to the user device. In other embodiments, method 400 may be triggered in response to receiving unique identifying markers from any tuner 132 or agent 134. In some embodiments, receiving unique identifying markers from a tuner 132 or agent 134 may be triggered by a user marking a media content, such as a show, for recording. Hash values corresponding to the marked media content may then be sent by the tuner 132 or agent 134 to the network storage device 150, thereby triggering method 400.

As discussed above with respect to FIG. 1, the user device may connect through the communication network to the database in the cloud storage environment where the multimedia content is stored. Such a network connection may be used for requesting multimedia content as well as for receiving the multimedia content by the user device. In one embodiment, receiving the multimedia content may include downloading the multimedia content to the user device. In another embodiment, receiving the multimedia content may include receiving a live stream of the multimedia content.

Referring to FIG. 4, in response to receiving the request for multimedia content, at block 420, any or all of the segments of the multimedia content stored in the cloud storage environment may be downloaded or streamed to the user device. For example, the first and second segments (and any other stored segments) may be assembled in temporal order and sent or streamed in such order, so that the user device receives the multimedia content in proper order. However, it will be understood that in some embodiments the segments may be downloaded or received in any order by the user device, and such assembly may be performed locally by the user device. In some embodiments, segments corresponding to a multimedia content may be assembled to reconstruct the multimedia content within a cloud computing environment prior to receiving a request to access the multimedia content by a user device. For example, the segments may be assembled incrementally or upon receiving all segments corresponding to the multimedia content. In other embodiments, segments corresponding to a multimedia content may be assembled upon receiving a request to access the multimedia content. Assembling the segments at block 420 may further include encoding the assembled content, for example, according to the H.264 standard for video and the MP3 standard for audio. Process 400 may further include transcoding the assembled multimedia content. In one example, the multimedia content may be transcoded to be compatible with different types of devices, such as mobile phones. The network storage device 150 may be configured to receive data identifying the type of user device requesting access to a media content 200 and to serve a stream of the media content 200 in a format supported by the user device.

In some embodiments, assembling the segments may include concatenating a plurality of segments of a multimedia content to generate a segment of multimedia content that is larger than each segment being concatenated. Concatenating a plurality of segments to generate a larger segment may enable efficient playback of the multimedia content on a user device. In one example, each of a plurality of segments may have a size of 200 milliseconds, and 40 segments may be concatenated to generate a segment having a size of 8 seconds. In general, multiple segments may be concatenated to form concatenated segments that are about 2 to 10 seconds in length, although the present invention is not so limited, as the length of concatenated segments may vary by the type of multimedia content, the type of multimedia playback device, etc. In some embodiments, various segments of a plurality of segments being concatenated may have various sizes. In some embodiments, assembling the segments may include accessing information on the type of user device being used for playback of the multimedia content and determining the number of segments to be concatenated based on the type of user device. Determining the number of segments to be concatenated may further be based on the sizes of the segments.

Concatenating a plurality of segments may also enable efficiently transcoding the multimedia content. According to one aspect, it is appreciated that transcoding a larger segment is more efficient than transcoding a plurality of smaller segments. In some embodiments, transcoding may be performed in parallel, thereby enabling more effective post processing of multimedia content for playback on user devices. In one embodiment, smaller segments of a video signal corresponding to a multimedia content may be concatenated to generate a larger segment of video signal, thereby enabling more efficient post processing such as matching the larger video segment to a corresponding audio signal of the multimedia content.

In some embodiments, process 400 may further include checking, upon receiving a request for multimedia content at block 418, whether the user device requesting the multimedia content is authorized to access the multimedia content. In one embodiment, checking whether a user device is authorized to access the multimedia content includes checking whether the user device is associated with a respective tuner and/or agent that was used to upload unique identifying markers corresponding to segments of the multimedia content. In one example, metadata associated with segments of the requested multimedia content stored in a cloud computing environment may be used to search whether a specific tuner and/or agent was used to upload unique identifying markers of the segments of the multimedia content. In accordance with another embodiment, described in more detail further below, checking whether a user device is authorized to access the multimedia content may include checking whether the user device is associated with a respective tuner and/or agent that received the segments of multimedia content, irrespective of whether any one or more of those segments of multimedia content were actually uploaded and stored in the cloud computing environment (e.g., because those segments were uploaded from another user device.) Process 400 may then proceed to block 420 in response to verifying that the user device is authorized to access the multimedia content.

The method 400 shown in FIG. 4 and described above is an exemplary process for retrieving each segment of the multimedia content, storing it in the cloud storage environment, and distributing the stored segments to a user device upon request. In this manner, the multimedia content may be uploaded from one location and downloaded or streamed to another location, such as in the situation where the user wishes to view the multimedia content away from home, although it will be understood that some or all of the segments may be downloaded or streamed to the same location from which they were uploaded.

Although FIG. 4 has been described as determining whether a single copy of each segment of the multimedia content has been uploaded and stored, it should be appreciated that that in certain embodiments, the method 400 may be modified to request, upload, and store multiple copies of each segment of the multimedia content. For example, the method 400 may be modified to determine whether a predetermined number of copies of a respective segment of the multimedia content are stored in the database, and if the predetermined number of copies of the respective segment have yet to be stored, to request one or more receiving devices to upload another copy of the respective segment until the predetermined number of copies of the respective segment have been stored.

Figure 5:
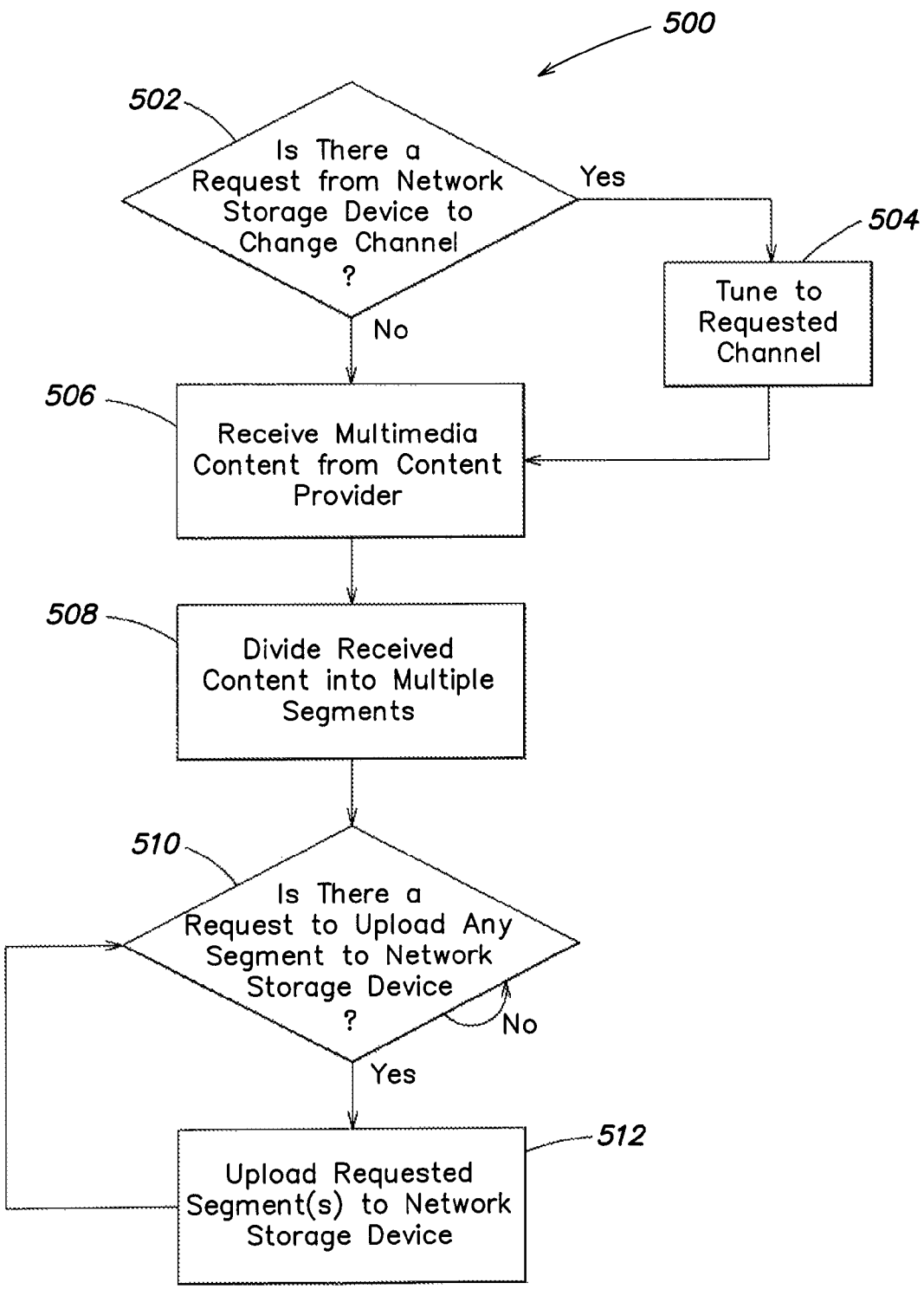
FIG. 5 is a flow diagram of another exemplary process of retrieving, storing and distributing the media content of FIG. 2 in accordance with one embodiment.

FIG. 5 is a flow diagram of another example of a method 500 for retrieving, storing and distributing multimedia content in accordance with one embodiment. While the method 400 of FIG. 4 is, in one instance, described from the perspective of the cloud storage environment, the method 500 can be described, in this example, from the perspective of the tuner 132 and/or agent 134 of FIG. 1. As described above, each tuner 132 and/or agent 134 is connected to the network storage device 150 via the network 140. Independently of the network storage device 150, the tuner 132 may continuously receive and acquire multimedia content from the content provider 110. The tuner 132 and any associated devices may store the acquired multimedia content for an indefinite period of time, depending upon the configuration and capacity of any local storage device(s). At block 502, the tuner 132 and/or agent 134 waits to receive a request from the network storage device to change the channel, that is, a request to tune to a specific content provider 110. Such a request from the network storage device may be received in response to the user of the media content receiving device that includes the tuner 132 and agent 134 having previously indicated to the network storage device 150 that certain multimedia content from the specific content provider be acquired (e.g., recorded). If such a request is received, at block 504, the tuner 132 tunes to the requested content provider 110, or channel. The tuner 132 and/or agent 134 may refuse to honor the request (i.e., not change the channel) if the tuner 132 is busy receiving and acquiring a different program, such as when the tuner 132 is being used to watch live television. However, if the tuner 132 is idle (e.g., it is not being used), it may honor the request to change the channel, or if the multimedia content receiving device has multiple tuners, the multimedia content receiving device may honor the request using a tuner that is not currently in use.

At block 506, the tuner 132 receives and acquires at least a portion of the multimedia content from the content provider 110, such as described above with respect to FIG. 1 (e.g., receive the signal 120). The multimedia content, or portion thereof, is divided into multiple segments, at block 508, by either the tuner 132 or the agent 134, such as described above with respect to FIG. 2. As mentioned earlier, each segment may be stored locally (e.g., in a buffer) by the tuner 132 and/or agent 134 for an indefinite period of time.

At block 510, the agent 134 waits for a request from the network storage device 150 to upload any one or more of the stored segments of the multimedia content to the network storage device 150. It will be understood that the network storage device may request none, one, several, or all of the segments 210 from the agent 134. If the agent 134 and/or tuner 132 receives the request, at block 512, the requested segment or segments are uploaded to the network storage device 150 via the network 140. Blocks 510 and 512 may repeat indefinitely, provided that the agent 134 and/or tuner 132 is able to provide the requested segment or segments to the network storage device 150. For example, eventually some or all of the segments 210 may be deleted from the local storage of the tuner 132/agent 134, and consequently the tuner 132/agent 134 would no longer be able to satisfy the upload request.

Figure 6:
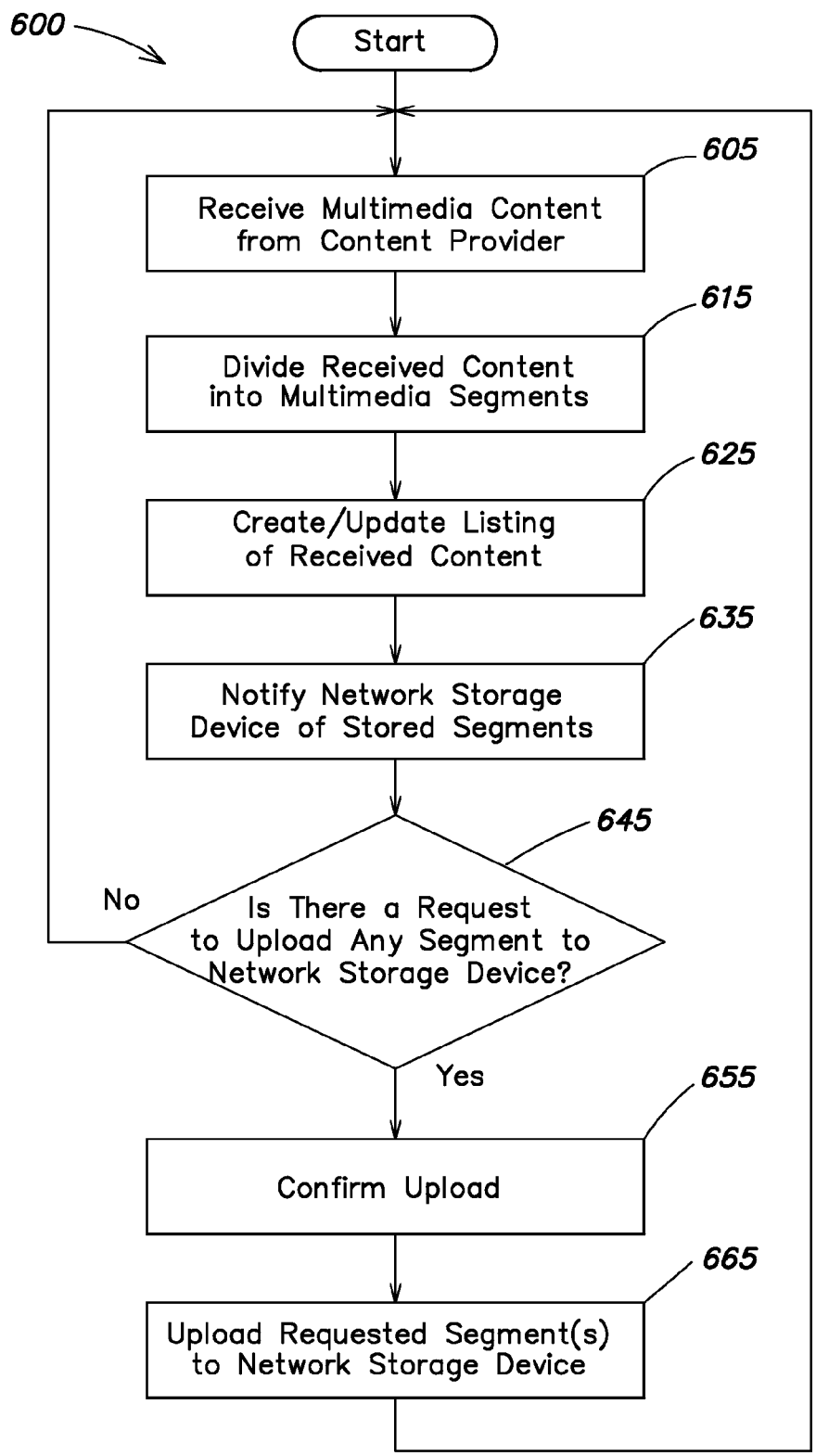
FIG. 6 is a flow diagram of another exemplary process of retrieving, storing and distributing the media content of FIG. 2 in accordance with another embodiment.

FIG. 6 is a flow diagram of a method 600 for retrieving, storing and distributing multimedia content in accordance with another embodiment. As with the method 500 of FIG. 5, the method 600 is described primarily from the perspective of the tuner 132 and/or agent 134 of FIG. 1. As previously described above, each tuner 132 and/or agent 134 is connected to the network storage device 150 via the network 140. Independently of the network storage device 150, the tuner 132 may continuously receive and acquire multimedia content from the content provider 110. The tuner 132 and any associated devices may store the acquired multimedia content for an indefinite period of time, for example, in a local buffer, depending upon the configuration and capacity of any local storage device(s).

At block 605, the tuner 132 receives and acquires at least a portion of the multimedia content from the content provider 110, such as described above with respect to FIG. 1 (e.g., receive the signal 120). The multimedia content may be received and acquired at block 605 in response to a request from the network storage device 150 to change the channel, that is, a request to tune to a specific content provider 110, such as described with respect to block 502 in FIG. 5, and tuning to that requested channel (e.g., block 504 in FIG. 5). Alternatively, the tuner may simply be tuned to a particular channel because the user of the media content receiving device is viewing and/or listening to a particular channel.

At block 615 the multimedia content, or portion thereof, is divided into multiple segments by either the tuner 132 or the agent 134, such as described above with respect to FIG. 2. As previously described, each segment may be stored locally (e.g., in a buffer) by the tuner 132 and/or agent 134 for an indefinite period of time depending on the size of the buffer.

At block 625, the agent 134 sends a communication to the network storage device 150 causing the network storage device to create or update a listing (termed a 'rendition' herein) that identifies all of the segments that are received by the tuner 132 that is coupled to the agent 134. In accordance with an aspect of the present invention, the communication sent by the agent includes a unique identifying marker that uniquely identifies each segment of multimedia content received by the tuner, such as a hash value of the segment, as well as other information or metadata relevant to the storage, retrieval, and distribution of the media content. In one embodiment, the additional information can include an identifier of the tuner, such as an IP address of the tuner, a signal frequency of the channel, a program or channel identifier of the channel on which the segment was received, and a timestamp of when the segment was received. In response to this communication, the network storage device 150 creates the listing, or updates the listing (if such a listing has previously been created) maintained by the network storage device. As described more fully below, this listing or rendition that is maintained by the network storage device 150 permits the network storage device to identify segments as belonging to media content acquired by a particular tuner, and can be used to determine whether access to the media content is authorized (e.g. block 418 in FIG. 4). Although block 625 is illustrated and described as being performed as part of the method 600, it should be appreciated that in at least some embodiments, the creation and updating of the rendition is performed in a parallel process that executes independently of the uploading of multimedia content.

At block 635, the agent 134 sends a communication to the network storage device 150 notifying the network storage device of what segments have been locally stored by the tuner/agent and are available for uploading. In accordance with one embodiment, the communication that is sent by the agent 134 includes a listing, such as a listing of the hash values of each of the segments that are available for uploading, to the network storage device 150.

At block 645, the agent 134 waits for a request from the network storage device 150 to upload any one or more of the stored segments of the multimedia content to the network storage device. It will be understood that the network storage device 150 may request none, one, several, or all of the segments 210 from the agent 134. In accordance with one embodiment, the request from the network storage device identifies which segments of the segments that are available for uploading by the tuner/agent are desired, as well as the order in which the segments should be uploaded. In accordance with one embodiment, the network storage device 150 identifies which of the segments available for uploading and the order in which they are to be uploaded by sending a listing to the agent 134 of the hash values of each segment to be uploaded in the desired order of uploading. It should be appreciated that the network storage device may be programmed with different prioritization schemes for determining the order in which segments are to be uploaded. For example, the network storage device 150 may order the segments such that the oldest segments are uploaded first (e.g., first in, first out in time), or as discussed further below, those segments that correspond to segments that the fewest number of other agents are also capable of uploading, or are actually being uploaded by other agents, are uploaded first.

Where no request from the network storage device 150 is received at block 645, or where the network storage device responds to the notification (at block 635) indicating that none of the available segments are to be uploaded, the tuner/agent may discard any locally stored segments not requested by the network storage device and the agent 134 may return to block 605, wherein blocks 605 through 645 may be repeated. Alternatively, where a request from the network storage device 150 to upload one or more segments is received at block 645, the agent 134 proceeds to block 655.

At block 655 the agent 134 sends a communication to the network storage device 150 requesting the network storage device to confirm whether each requested segment is still desired to be uploaded. In response to this communication, the network storage device responds (e.g., with a 'yes' or a 'no') identifying each segment that is to be uploaded and each segment that is not to be uploaded. The agent 134 may then discard any of the segments that are not to be uploaded. In response to a communication confirming that at least one of the segments is to be uploaded, the agent proceeds to block 665.

At block 655, the agent 134 uploads the requested segment or segments in the desired order to the network storage device 150 via the network 140. In accordance with an aspect of the present invention, the agent may inform the network storage device when it has begun uploading a particular segment. This may permit the network storage device to notify other agents that may have the same segments available for uploading that those segments do not need to be uploaded. For example, in one embodiment, the network storage device may request each segment of multimedia content to be uploaded a predetermined number of times (e.g., 2-4 times) for reliability, robustness, or redundancy reasons. Once the predetermined number of copies of a particular segment have be uploaded, or have been indicated as being uploaded, the network storage device 150 may alert other agents that those same segments no longer need to be uploaded. In response to uploading the requested segment or segments, the agent 150 may return to block 605, wherein blocks 605-665 may be repeated.

In accordance with an aspect of the present invention, the rendition or listing of segments that is created and maintained by the network storage device 150 (e.g., in block 625) permits the network storage device to identify whether segment of multimedia content were received by a particular tuner 132 and/or agent 134, irrespective of whether any segments of that multimedia content were ever uploaded by that particular tuner/agent. This can enable to the network storage device to restrict access to multimedia content (e.g., in blocks 418 and 420 of FIG. 4) to only those segments of media content that were actually received by a particular tuner/agent. Thus, for example, where a particular television program is received by a number of different tuner/agents in varying geographic locations, each tuner/agent may be provided with access to the segments corresponding to the particular television program itself, but each tuner/agent may be restricted to accessing only those segments of multimedia content, such as commercials, newsbreaks, etc. that accompanied the particular television program received by the particular tuner/agent or tuners/agents in the same geographic area.

Various embodiments may be implemented on one or more computer systems. For example, the network storage device 150 of FIG. 1 may be implemented in a single computer system or in multiple computer systems and may be included in a cloud computing environment. These computer systems may be, for example, general-purpose computers such as those based on Intel PENTIUM-type processor, Motorola PowerPC, Sun UltraSPARC, Hewlett-Packard PA-RISC processors, or any other type of processor, virtual machines or cloud computing systems including infrastructure, platform or software in any cloud computing environment known to one of ordinary skill in the art.

Figure 7:
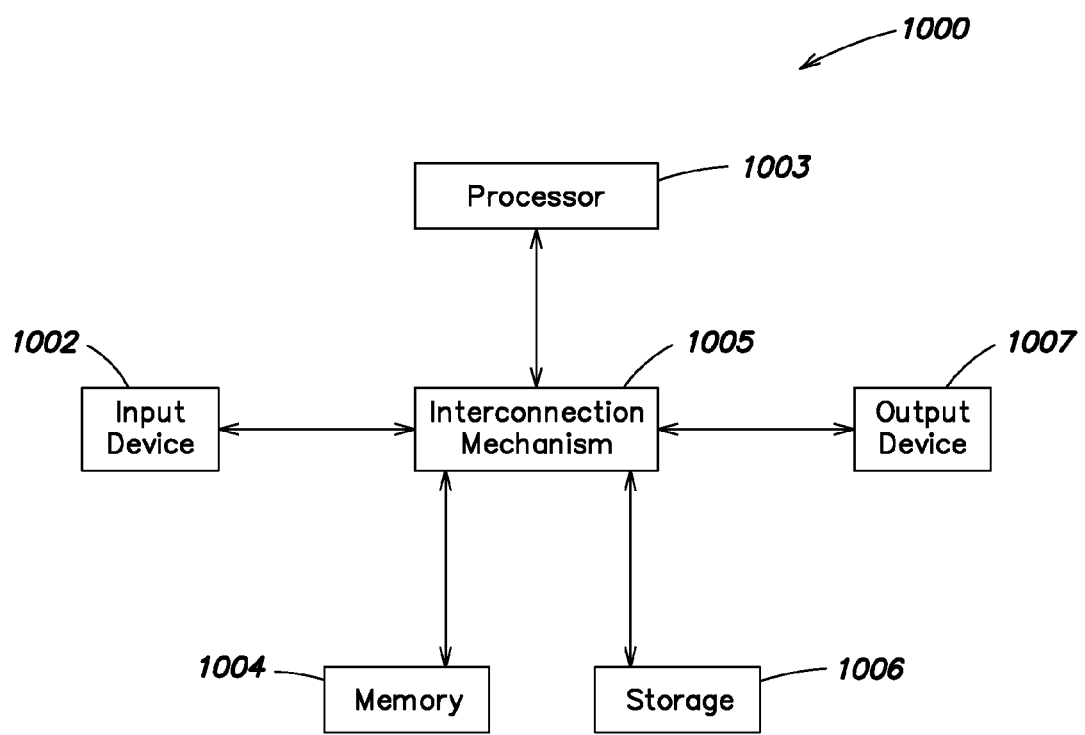
FIG. 7 is a functional block diagram of a computer system in accordance with one embodiment.

For example, various aspects may be implemented as specialized software executing in a general-purpose computer system 1000 such as that shown in FIG. 7. The computer system 1000 may include a processor 1003 connected to one or more memory devices 1004, such as a disk drive, memory, or other device for storing data. Memory 1004 is typically used for storing programs and data during operation of the computer system 1000. The computer system 1000 may also include a storage system 1006 that provides additional storage capacity. Components of computer system 1000 may be coupled by an interconnection mechanism 1005, which may include one or more busses (e.g., between components that are integrated within a same machine) and/or a network (e.g., between components that reside on separate discrete machines). The interconnection mechanism 1005 enables communications (e.g., data, instructions) to be exchanged between system components of system 1000.

Computer system 1000 also includes one or more input devices 1002, for example, a keyboard, mouse, trackball, microphone, touch screen, and one or more output devices 1007, for example, a printing device, display screen, speaker. In addition, computer system 1000 may contain one or more interfaces (not shown) that connect computer system 1000 to a communication network (in addition or as an alternative to the interconnection mechanism 1005).

Figure 8:
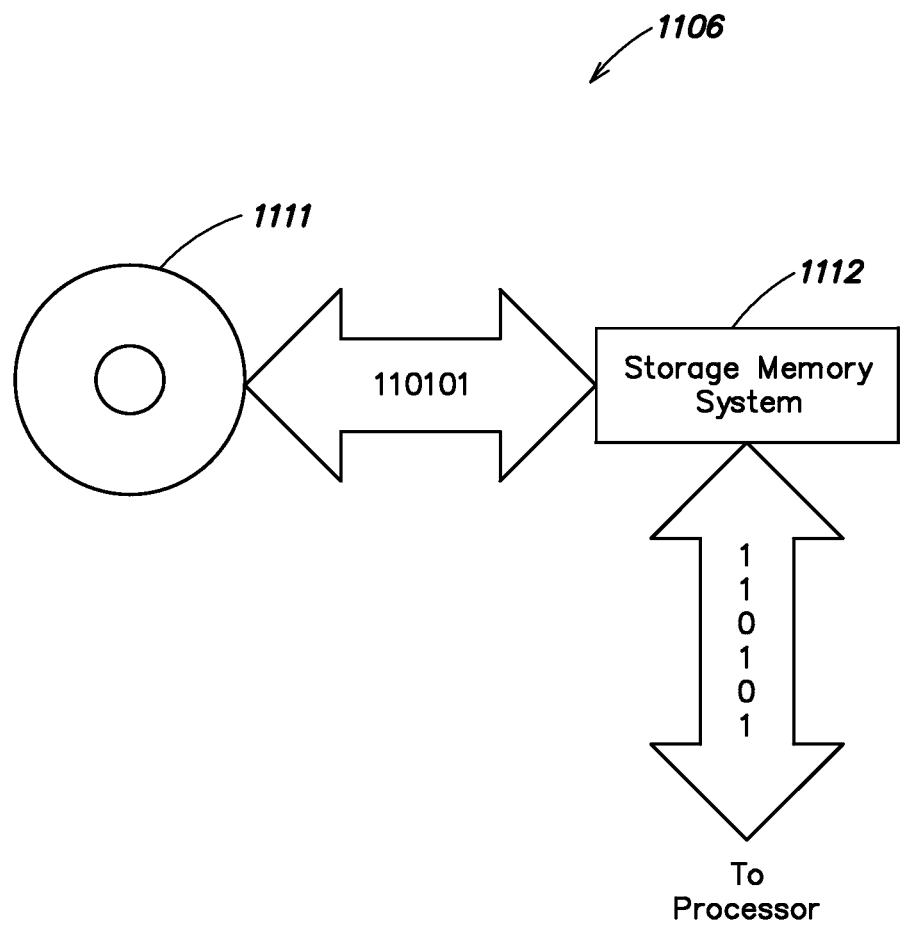
FIG. 8 is a functional block diagram of a storage system that may be used with the computer system of FIG. 7.

The storage system 1006, shown in greater detail in FIG. 8, typically includes a computer readable and writeable nonvolatile recording medium 1111 in which signals are stored that define a program to be executed by the processor or information stored on or in the medium 1111 to be processed by the program to perform one or more functions associated with embodiments described herein. The medium may, for example, be a disk or flash memory. Typically, in operation, the processor causes data to be read from the nonvolatile recording medium 1111 into another memory 1112 that allows for faster access to the information by the processor than does the medium 1111. This memory 1112 is typically a volatile, random access memory such as a dynamic random access memory (DRAM) or static memory (SRAM). It may be located in storage system 1106, as shown, or in memory system 1004. The processor 1003 generally manipulates the data within the integrated circuit memory 1004, 1112 and then copies the data to the medium 1111 after processing is completed. A variety of mechanisms are known for managing data movement between the medium 1111 and the integrated circuit memory element 1004, 1112, and the invention is not limited to any particular mechanism, or to any particular memory system 1004 or storage system 1006.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1000 is shown by way of example as one type of computer system upon which various aspects of the invention may be practiced, it should be appreciated that aspects of the invention are not limited to being implemented on the computer system as shown in FIG. 7. Various aspects of the invention may be practiced on one or more computers having a different architecture or having different components than those shown in FIG. 7. Further, where functions or processes of embodiments of the invention are described herein (or in the claims) as being performed on a processor or controller, such description is intended to include systems that use more than one processor or controller to perform the functions.

Computer system 1000 may be a general-purpose computer system that is programmable using a high-level computer programming language. Computer system 1000 may also be implemented using specially programmed, special purpose hardware. In computer system 1000, processor 1003 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP or Vista operating systems available from the Microsoft Corporation, MAC OS System X operating system available from Apple Computer, the Solaris operating system available from Sun Microsystems, or UNIX or Linux operating systems available from various sources. Many other operating systems may be used.

The processor and operating system together define a computer platform for which application programs in high-level programming languages are written. It should be understood that embodiments of the invention are not limited to a particular computer system platform, processor, operating system, or network. Also, it should be apparent to those skilled in the art that the present invention is not limited to a specific programming language or computer system, as a variety of programming languages and/or computer systems may be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. Thus, various aspects of the invention may be performed on a client-server or multi-tier system that includes components distributed among one or more server systems that perform various functions according to various embodiments of the invention. These components may be executable, intermediate (e.g., Common Intermediate Language or CIL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or Q (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A method of retrieving, storing and distributing multimedia content, the method comprising:
   receiving, by a network storage device coupled to a communication network, a first segment of a plurality segments of the multimedia content from a first multimedia content receiving device coupled to the communication network;
   receiving, by the network storage device, a second segment of the plurality of segments of the multimedia content from a second multimedia content receiving device coupled to the communication network, the second multimedia content receiving device being different than the first multimedia content receiving device and the second segment being different than the first segment; and
   storing the first segment and the second segment on the network storage device;
   wherein each multimedia content receiving device is capable of retrieving and displaying at least one of the plurality of segments stored on the network storage device at a later time;
   wherein each segment of the plurality of segments has corresponding identification information; and
   wherein the network storage device determines whether to request a segment of the plurality of segments from a multimedia content receiving device for storage on the network storage device based on corresponding identification information for the segment.

2. The method of claim 1, wherein the plurality of segments are non-overlapping segments.

3. The method of claim 1, further comprising:
   receiving, by the network storage device, corresponding identification information for the first segment from the first multimedia content receiving device; and
   determining, by the network storage device, whether the first segment is stored on the network storage device based on the corresponding identification information for the first segment.

4. The method of claim 3, further comprising:
   in response to determining that the first segment is not stored on the network storage device, the network storage device sending a first request to the first multimedia content receiving device requesting the first multimedia content receiving device to upload the first segment to the network storage device via the communication network; and
   in response to determining that the first segment is stored on the network storage device, the network storage device sending a message to the first multimedia content receiving device confirming that the first segment is stored on the network storage device, wherein the first multimedia content receiving device may delete the first segment from the first multimedia content receiving device upon receiving the message.

5. The method of claim 4, further comprising:
   receiving, by the network storage device, corresponding identification information for the second segment from the second multimedia content receiving device; and
   determining, by the network storage device, whether the second segment is stored on the network storage device based on the corresponding identification information for the second segment.

6. The method of claim 5, wherein in response to determining that the second segment is not stored on the network storage device, the method further comprises sending a second request to the second multimedia content receiving device requesting the second multimedia content receiving device to upload the second segment to the network storage device via the communication network.

7. The method of claim 6, further comprising assigning a unique identifier to each segment of the plurality of segments, wherein the unique identifier is included in corresponding identification information for the segment, and wherein the unique identifier includes is based on one of the following: a hash value of the segment, and a unique identifying portion of the segment.

8. The method of claim 7, wherein determining whether the first segment is stored on the network storage device based on corresponding identification information for the first segment includes determining whether a unique identifier assigned to a segment stored on the network storage device is the same as a unique identifier assigned to the first segment.

9. The method of claim 8, wherein determining whether the second segment is stored on the network storage device based on corresponding identification information for the second segment includes determining whether a unique identifier assigned to a segment stored on the network storage device is the same as a unique identifier assigned to the second segment.

10. The method of claim 6, further comprising sending, to the first multimedia content receiving device, a first command directing the first multimedia content receiving device to tune into a channel broadcasting the multimedia content.

11. The method of claim 10, further comprising sending, to the second multimedia content receiving device, a second command directing the second multimedia content receiving device to tune into the channel broadcasting the multimedia content.

12. The method of claim 1, further comprising:
   receiving, by the network storage device, a request from a user device operatively coupled to the communication network to access at least one of the plurality of segments stored on the network storage device;
wherein the network storage device includes a cloud storage environment.

13. The method of claim 12, further comprising sending at least one of the plurality of segments from the network storage device to the user device through the communication network in response to receiving the request from the user device.

14. The method of claim 13, further comprising formatting the plurality of segments of the multimedia content in one of a plurality of formats compatible with the user device prior to sending at least one of the plurality of segments from the network storage device to the user device.

15. The method of claim 12, further comprising determining, in response to receiving the request from the user device, whether the user device is associated by subscription with at least one of the first multimedia content receiving device and the second multimedia content receiving device, and sending at least one of the plurality of segments of the multimedia content from the network storage device to the user device only if the user device is determined to be associated by subscription with the at least one of the first multimedia content receiving device and the second multimedia content receiving device.

16. A method of retrieving, storing and distributing multimedia content, the method comprising:
receiving at least a portion of the multimedia content from a content provider using a multimedia content receiving device;
dividing the received portion of the multimedia content into a plurality of segments of the multimedia content using the multimedia content receiving device; and
uploading at least one of the plurality of segments from the multimedia content receiving device to a network storage device via a communication network;
wherein the multimedia content receiving device is capable of retrieving and displaying at least one of the plurality of segments uploaded to the network storage device at a later time;
wherein each segment of the plurality of segments has corresponding identification information; and
wherein a determination of whether to upload a segment of the plurality of segments from the multimedia content receiving device to the network storage device is based on corresponding identification information for the segment.

17. The method of claim 16, wherein the plurality of segments are non-overlapping segments.

18. The method of claim 16, further comprising receiving, from the network storage device via the communication network, a request to upload the at least one of the plurality of segments of the multimedia content to the network storage device, and in response thereto, uploading the at least one of the plurality of segments of the multimedia content to the network storage device.

19. The method of claim 18, further comprising receiving, from the network storage device via the communication network, a command directing the multimedia content receiving device to tune into a channel broadcasting the multimedia content, and in response thereto, tuning the multimedia content receiving device into the channel broadcasting the multimedia content.

20. The method of claim 16, further comprising sending a communication to the network storage device via the communication network identifying each segment of the plurality of segments of the received portion of the multimedia content.

21. The method of claim 20, wherein the communication uniquely identifies each segment of the plurality of segments of the received portion of the multimedia content and wherein the communication further includes at least one of a unique identifier of the multimedia content receiving device, a signal frequency of a channel over which the received portion of the multimedia content was received, a channel identifier of the channel over which the received portion of the multimedia content was received, and a timestamp indicative of a time at which each segment of the plurality of segments of the received portion of the multimedia content was received.

22. The method of claim 21, wherein:
the received portion of the multimedia content is a first received portion of the multimedia content;
the plurality of segments is a first plurality of segments;
the communication is a first communication; and
the method further comprising:
receiving a second portion of the multimedia content;
dividing the second received portion of the multimedia content into a second
plurality of segments of the multimedia content using the multimedia content receiving device; and
sending a second communication the network storage device via the communication network identifying each segment of the second plurality of segments of the multimedia content.

23. The method of claim 16, further comprising sending a communication to the network storage device via the communication network identifying each segment of the plurality of segments of the received portion of the multimedia content that is available for uploading.

24. The method of claim 23, further comprising:
receiving, from the network storage device via the communication network, a request to upload the plurality of segments to the network storage device, the request uniquely identifying each of the plurality of segments and a desired order in which the plurality of segments are to be uploaded;
requesting confirmation from the network storage device to upload each of the plurality of segments of the multimedia content in the desired order; and
uploading the at least one of the plurality of segments to the network storage device in the desired order in response to confirmation from the network storage device.

25. The method of claim 16, further comprising notifying the network storage device via the communication network that the at least one of the plurality of segments is being uploaded.

26. A system for retrieving, storing and distributing multimedia content comprising:
a network storage device operatively coupled to a communication network, the network storage device including a storage medium and a processor configured to:
receive a first segment of a plurality of segments of the multimedia content from a first multimedia content receiving device operatively coupled to the communication network;
receive a second segment of the plurality of segments from a second multimedia content receiving device operatively coupled to the communication network, the second multimedia content receiving device being different than the first multimedia content receiving device and the second segment being different than the first segment; and
store the first segment and the second segment on the storage medium;

wherein each multimedia content receiving device is capable of retrieving and displaying at least one of the plurality of segments stored on the storage medium at a later time;

wherein each segment of the plurality of segments has corresponding identification information; and wherein the network storage device determines whether to request a segment of the plurality of segments from a multimedia content receiving device for storage on the network storage device based on corresponding identification information for the segment.

27. The system of claim 26, wherein the plurality of segments are non-overlapping segments.

28. The system of claim 26, wherein the processor is further configured to:

receive corresponding identification information for the first segment from the first multimedia content receiving device; and determine whether the first segment is stored on the storage medium based on the corresponding identification information for the first segment.

29. The system of claim 28, wherein:

in response to determining that the first segment is not stored on the storage medium, the processor is further configured to send a first request to the first multimedia content receiving device requesting the first multimedia content receiving device to upload the first segment to the network storage device via the communication network; and in response to determining that the first segment is stored on the network storage device, the processor is further configured to send a message to the first multimedia content receiving device confirming that the first segment is stored on the network storage device, wherein the first multimedia content receiving device may delete the first segment from the first multimedia content receiving device upon receiving the message.

30. The system of claim 29, wherein the processor is further configured to:

receive corresponding identification information for the second segment from the second multimedia content receiving device; and determine whether the second segment is stored on the storage medium based on the corresponding identification information for the second segment.

31. The system of claim 30, wherein the processor is further configured to send a second request to the second multimedia content receiving device requesting the second multimedia content receiving device to upload the second segment to the network storage device via the communication network in response to determining that the second segment is not stored on the storage medium.

32. The system of claim 31, wherein the processor is further configured to receive a unique identifier for each segment of the plurality of segment, wherein the unique identifier is included in corresponding identification information for the segment, and wherein the unique identifier includes is based on one of the following: a hash value of the segment, and a unique identifying portion of the segment.

33. The system of claim 32, wherein the processor is further configured to determine whether a unique identifier assigned to a segment stored on the network storage device is the same as a unique identifier assigned to the first segment.

34. The system of claim 33, wherein the processor is further configured to determine whether a unique identifier assigned to a segment stored on the network storage device is the same as a unique identifier assigned to the second segment.

35. The system of claim 31, wherein the processor is further configured to send, to the first multimedia content receiving device, a first command directing the first multimedia content receiving device to tune to a channel broadcasting the multimedia content.

36. The system of claim 35, wherein the processor is further configured to send, to the second multimedia content receiving device, a second command directing the second multimedia content receiving device to tune to the channel broadcasting the multimedia content.

37. The system of claim 26, wherein:

the processor is further configured to receive a request from a user device operatively coupled to the communication network to send at least one of the plurality of segments stored on the storage medium to the user device via the communication network; and the storage medium includes a cloud storage environment.

38. The system of claim 37, wherein the processor is further configured to send at least one of the plurality of segments from the network storage device to the user device through the communication network in response to receiving the request from the user device.

39. The system of claim 38, wherein the processor is further configured to format the plurality of segments in one of a plurality of formats compatible with the user device prior to sending at least one of the plurality of segments from the network storage device to the user device.

40. The system of claim 37, wherein the processor is further configured to determine, in response to receiving the request from the user device, whether the user device is associated by subscription with at least one of the first multimedia content receiving device and the second multimedia content receiving device, and to send at least one of the plurality of segments of the multimedia content from the network storage device to the user device only if the user device is determined to be associated by subscription with the at least one of the first multimedia content receiving device and the second multimedia content receiving device.

41. A non-transitory computer readable medium having stored thereon sequences of instructions including instructions that will cause a processor of a network storage device having a storage medium therein and being operatively coupled to a communication network to:

receive a first segment of a plurality of segments of the multimedia content from a first multimedia content receiving device operatively coupled to the communication network;

receive a second segment of the plurality of segments from a second multimedia content receiving device operatively coupled to the communication network, the second multimedia content receiving device being different than the first multimedia content receiving device and the second segment being different than the first segment; and store the first segment and the second segment on the storage medium;

wherein each multimedia content receiving device is capable of retrieving and displaying at least one of the plurality of segments stored on the storage medium at a later time;

wherein each segment of the plurality of segments has corresponding identification information; and wherein the network storage device determines whether to request a segment of the plurality of segments from a multimedia content receiving device for storage on the network storage device based on corresponding identification information for the segment.

42. The non-transitory computer readable medium of claim 41, wherein the plurality of segments are non-overlapping segments.

43. The non-transitory computer readable medium of claim 41, further including an instruction to cause the processor to:
receive corresponding identification information for the first segment from the first multimedia content receiving device; and
determine whether the first segment is stored on the storage medium based on the corresponding identification information for the first segment.

44. The non-transitory computer readable medium of claim 43, further including:
an instruction to cause the processor to send, in response to determining that the first segment is not stored on the storage medium, a first request to the first multimedia content receiving device requesting the first multimedia content receiving device to upload the first segment to the network storage device via the communication network in response to determining that the first segment is not stored on the storage medium; and
an instruction to cause the processor to send, in response to determining that the first segment is stored on the storage medium, a message to the first multimedia content receiving device confirming that the first segment is stored on the storage medium, wherein the first multimedia content receiving device may delete the first segment from the first multimedia content receiving device upon receiving the message.

* * * * *